United States Patent
Robb

(10) Patent No.: US 7,854,614 B2
(45) Date of Patent: Dec. 21, 2010

(54) MULTI-CONTACT UNIVERSALLY JOINTED POWER AND/OR SIGNAL CONNECTOR DEVICES

(76) Inventor: John R. Robb, 3118 Chesterfield La., Stafford, TX (US) 77477

( * ) Notice: Subject to any disclaimer, the term of this patent is extended or adjusted under 35 U.S.C. 154(b) by 89 days.

(21) Appl. No.: 12/316,413

(22) Filed: Dec. 12, 2008

(65) Prior Publication Data

US 2009/0154883 A1 Jun. 18, 2009

Related U.S. Application Data

(60) Provisional application No. 61/007,746, filed on Dec. 14, 2007.

(51) Int. Cl.
*H01R 35/00* (2006.01)
*H01R 39/00* (2006.01)

(52) U.S. Cl. .................. 439/8; 439/271; 439/519

(58) Field of Classification Search .................. 439/8, 439/13, 21
See application file for complete search history.

(56) References Cited

U.S. PATENT DOCUMENTS

| | | | |
|---|---|---|---|
| 1,650,014 A | 11/1927 | Goldrick | |
| 1,953,864 A | 4/1934 | Morris | |
| 1,957,714 A | 5/1934 | Jones | |
| 2,007,617 A | 7/1935 | Sheward | |
| 2,519,933 A | 8/1950 | Rouault | |
| 2,564,520 A | 8/1951 | Blasdell | |
| 2,652,546 A | 9/1953 | Christner | |
| 2,673,965 A | 3/1954 | Cass | |
| 3,012,798 A | 12/1961 | Berger | |
| 3,116,940 A | 1/1964 | Jines | |
| 3,328,741 A | 6/1967 | Brown | |
| 4,746,297 A | 5/1988 | Soleau | |
| 4,978,306 A | 12/1990 | Robb | |
| 5,018,980 A | 5/1991 | Robb | |
| 6,893,267 B1 * | 5/2005 | Yueh | 439/8 |
| 7,025,595 B1 * | 4/2006 | Chan et al. | 439/6 |
| 7,341,457 B2 * | 3/2008 | Lagathu et al. | 439/8 |
| 2009/0154883 A1 * | 6/2009 | Robb | 385/56 |
| 2010/0151699 A1 * | 6/2010 | Cho | 439/13 |
| 2010/0157601 A1 * | 6/2010 | Robb | 362/249.06 |

* cited by examiner

*Primary Examiner*—James Harvey
(74) *Attorney, Agent, or Firm*—Shaper Iler LLP; Sue Shaper

(57) ABSTRACT

An adjustable at least four-way electrical connector for signal, power, voice and/or data communication, comprising at least four adjustable electrical connections utilizing a ball and socket type physical connection device and including a weatherproofing gasket; also an adjustable fiber optic connection device utilizing ball and socket type construction wherein an optical fiber can be split into a plurality of optical fibers via a connection device providing for rotation and pivoting.

6 Claims, 4 Drawing Sheets

MULTI-CONTACT UNIVERSALLY JOINTED POWER AND/OR SIGNAL CONNECTOR DEVICES

This invention relates to and claims priority to co-pending provisional application Ser. No. 61/007,746, filed Dec. 14, 2007, entitled Improvements to Snap-apart Universal Jointed Electrical Connector Device, inventor John R. Robb.

FIELD OF THE INVENTION

The invention relates to connector devices for communicating power and/or data signals, including electrical and/or optical signals, and in particular provides a preferably snap-apart and snap-together four-contact universally jointed connector device.

BACKGROUND OF THE INVENTION

The instant invention represents an improvement to my prior invention embodied in two prior patents, U.S. Pat. Nos. 4,978,306 and 5,018,980. Both of the above patents are hereby herein incorporated by reference in their entirety.

The instant invention relates to designs for a (preferably snap-apart) connection device for power, electrical and/or optical signals. One aspect of the invention provides at least four contacts and is particularly applicable for telecommunications, for communication of voice and/or data information, as well as for other electrical communication where four or more contacts are required or desired. Features of the invention include a universal joint as well as a snap-apart snap-together connection. Another aspect of the invention provides a universal jointed snap-apart snap-together optical fiber splitter.

The preferably snap-apart electrical connection device can function as a four-contact universally jointed connector, particularly applicable for telecommunications uses. The ability of one element or layer of the connector, at times referred to as "a ball," to rotate essentially endlessly with respect to another element or layer of the connection device, at times referred to herein as "a socket," alleviates tangling issues. The further provision for tilting or pivoting of one layer with respect to the other layer of the connection device, to a significant extent, also alleviates potential tangling of electrical or communication lines.

The idea first occurred to me while sitting at a desk, frustrated with the tangle of the spiral cord on a telephone. When either answering or completing telephone calls, it is natural to rotate the telephone handset upon pick-up and return to the desk device.

With multiple phone calls, the cord between the handset and the desk device becomes twisted. When twisted, it is very difficult to straighten out. Usually, you have to disconnect the cord from either the handset or the desk device. Then, you spend a significant amount of time untwisting the cord, which will not just unwind by itself.

When you are done, the spiral design of the cord is usually kinked. Additional time has to be spent working the kinks, one spiral at a time, all the way to the end of the cord. When finished the spiral cord between the telephone handset and desk device is usually not the same as before the tangle occurred. The cord is damaged and never again will be as "good as new."

I wondered if there were a way to prevent the twisting and tangling from occurring in the first place. If you could, then there would be savings of frustration, time spent untangling and restoring the coil design of the telephone cord, prevention of damage to the cord itself, and savings of cost associated with replacing tangled and damaged telephone cords. This was when it occurred to me that, with improvement, my prior design for a snap-apart electrical connection could be applicable in telecommunications.

The "ball and socket" nature of a snap-apart electrical connection, as previously disclosed, would permit the required "rotation" needed to eliminate tangling, damage, and unnecessary replacement of the telephone cord. In addition to the positive, negative, and ground points of contact, needed for an electrical circuit, a fourth point of contact, however, would be needed to allow for this new and fundamentally different application, of the prior snap-apart electrical connection device, to the telecommunications industry. The availability of a location for the fourth connection point was not initially or readily apparent.

The prior art, embodied in my prior snap-apart electrical device, relies on the three-dimensional geometric properties of a sphere. It uses the two "poles" and "equator" of a sphere to accommodate rotation of the "ball" while, at the same time, maintaining constant connection via the "socket." Segregation of electrical contact points to the ends and middle of the sphere, and the resulting space between contact points, is necessary to prevent short-circuiting of the rotating electrical connection that the snap-apart device permits. See above referenced patents incorporated by reference.

Within the rigid geometry of a sphere, it was not immediately obvious how provision of a fourth point of contact could be accomplished. There are only two poles and one equator associated with any sphere. Telephone conversations need four contact points. A fourth contact point did not seem possible initially for the snap-apart electrical connection device I had previously invented.

The instant inventive idea subsequently suggested itself, to the effect that if the "socket" of my prior art snap-apart electrical connector could also function as a "ball," and if the "ball" of my prior art connector could be improved upon to further incorporate an outer layer "socket" or shell, then there could be an opportunity to provide a fourth connector as needed for telephone conversations. Indeed, even a fifth. To accomplish this improvement, I redesigned the inner layer "ball" component of my prior art connector by incorporating with it an outer layer "shell," of the same flexible non-conducting material. This redesign created the third layer, the "shell," needed to provide a location for the fourth electrical connection point. As discussed above, even a fifth connection point could be created.

For a fourth conductive path, an electrically conductive surface could be located inside the new flexible outer layer or "shell," at the top, or north, "pole" into which the "socket" from the prior art device now inserts as a ball. To complete the required fourth electrical connection, an electrically conductive contact point could be incorporated onto the exterior of the prior art "socket," now turned into an intermediate ball/socket layer, near the top "pole" opening provided for insertion of the prior art "ball."

Thus, redesigning the "ball" of the prior art snap-apart electrical connection device to now incorporate a third layer, an outer shell, provided one-half of the structural necessary for the fourth connection. The "socket" of the prior art snap-apart electrical connection, now redesigned as an intermediate layer functioning as both a ball and a socket, provides the other half of the fourth connection. The new intermediate layer snaps over the prior art "ball" and into the newly designed outer "shell" layer.

Not being certain that such a novel snap-apart electrical connection device could actually be constructed for application as a connector for telecommunication devices, I constructed a prototype model of the improvements needed for a telecommunications use. Construction and testing of the prototypical model demonstrated the feasibility of providing the fourth connection point. Operation of the prototypical model showed that a redesign of the prior art does provide an opportunity for at least the fourth connection necessary for the use of the snap-apart electrical connector in the telecommunication field. The new invention transformed the prior art into the type of connector that could be used in a new industry.

With this improvement, the snap-apart electrical connector could now be used for any telephone cord. In use, it would allow rotation of the cord in the socket and prevent damage due to tangling. In addition, the snap-apart feature eliminates the problems that arise when the plastic tab, needed to mechanically hold a typical communications connector into its socket and maintain the connection, has broken off accidentally and/or from frequent connection and disconnection.

Furthermore, while constructing the "shell" improvement, I realized that it provided an additional opportunity to further improve the prior art snap-apart electrical connection device. The addition of the new "shell" to the prior art "ball" provided the opportunity to add a "gasket" on the inside surface of the "shell" improvement. The gasket provides insulation from the environment.

As the "shell" improvement permits the "socket" of the prior art to now also act as a "ball" within the new "shell," a flexible, weather-proof gasket could be incorporated near the opening of the "shell." When the "socket" of the prior art is snapped over the "ball" and into the new shell, both "shell" and gasket" expand and encase a portion of the exterior of the prior art "socket." By enclosing the prior art "socket" with a "shell" and "gasket," a weather-proof seal is created while continuing to permit rotation of the prior art "plug" within the prior art "socket." As a result, the entire snap-apart connection device, whether used for telecommunications or for simple electrical connections, could be protected from a dangerous invasion of moisture. Thus in summary, the new "shell," that provides a third layer and enables a fourth connection point, necessary at least for telecommunications, also permits an unforeseen opportunity to provide a "gasket" necessary to permit use of the snap-apart electrical device in moisture prone locations and environments. In combination, these improvements to the prior art embodied in the snap-apart electrical device I previously developed, have addressed applications that were not previously foreseeable.

Please see the attached FIG. 1 for an illustration of the four contact point improvements described above. Please also note that spheres rotating within spheres will always have contact at the intersections of their equators. Please further note that, beyond those disclosed in the attached drawings, additional "shells" can be added to both "ball" and "socket," thereby providing additional contact "points." FIG. 4 illustrates such embodiments, particularly useful for multiple digital data channels.

The electrical plug described by prior art has further been improved to create a multi-channel connection device that is capable of transmitting not only electrical current, but also a plurality of channels of voice and digital data. The device shown in FIG. 4 discloses improvements on prior art as follows. Development of a first thermoplastic shell to the "ball," and a second similar shell on the "socket" provides additional contact points for transmission of multiple electronic signals needed for telecommunication of voice and digital data. Beyond contact points needed for electrical power, multiple points of contact permit the faster transmission of data associated with various computer protocols. Incorporation of this telecommunications related, specifically digital data, improvement to the snap-apart electrical connection disclosed in the above referenced patents allows use of the device as a multi-channel digital connector device for applications controlled by computer programming technologies. Incorporation of further weather-proof gaskets enhances use of the device in outdoor environments.

The following further embodiment also occurred to me. Optical fiber installations are also subject to "kinking" which destroys a section of optical fiber cable. The cable is expensive. Consequently, a flexible solution for splicing and repairing optical fiber cable would result in an economic savings to the industry. After installation, optical fiber networks often require new connections. The ability to easily and flexibly "splice" into the optical fiber network would provide additional flexibility for optical fiber network design.

A snap-apart device that embodies a single contact point is applicable to the fiber optic technology widely used in telecommunication and information technology industries. In this application the electrically conductive wire at the north "pole" of both the "ball" and "socket" of the snap-apart electrical device is replaced with optical grade fiber. Optical grade fiber in the "ball" is flared into a cone shape to allow rotation of the "ball," while maintaining continuity of the signal traveling along the optical fiber. Substituting optical fiber for electrically conductive wire in both the "ball" and "socket" of the prior art snap-apart electrical device represents an improvement on the prior art that permits application for repair of damaged optic fiber and modification of previously installed fiber optic information networks.

By substituting multiple optic fibers for the previously employed electrically conductive wires, the "splicing" capability embodied in the "ball" and "socket" snap-apart device can be employed to accommodate optically transmitted signals from more than one source.

This improvement is shown in the attached FIG. 2.

SUMMARY OF THE INVENTION

The invention comprises an adjustable at least four-way connector, particularly useful for telecommunications, including at least four electrical connections provided within a ball and socket type connector device. The ball and socket type connector provides for full rotation of an intermediate layer with respect to a outer and inner layer and for a pivot of the intermediate layer with respect to the outer and inner layers of up to approximately 30 degrees. Preferably the adjustable electrical connector device would snap together and apart and incorporates a protective insulating gasket between the outer and intermediate layers. The invention also provides an adjustable fiber optic connection device comprising a ball and socket type construction, wherein a first layer can fully rotate within a second layer and can pivot up to approximately 30 degrees with respect to the second layer, the adjustable connection device including a fiber optic path split into a plurality of paths as it passes through the ball and socket device. Preferably, the adjustable fiber optic connection device provides for the two layers to snap together and apart.

BRIEF DESCRIPTION OF THE DRAWINGS

A better understanding of the present invention can be obtained when the following detailed description of the preferred embodiments are considered in conjunction with the following drawings, in which.

DESCRIPTION OF THE PREFERRED EMBODIMENTS

Figure 1:
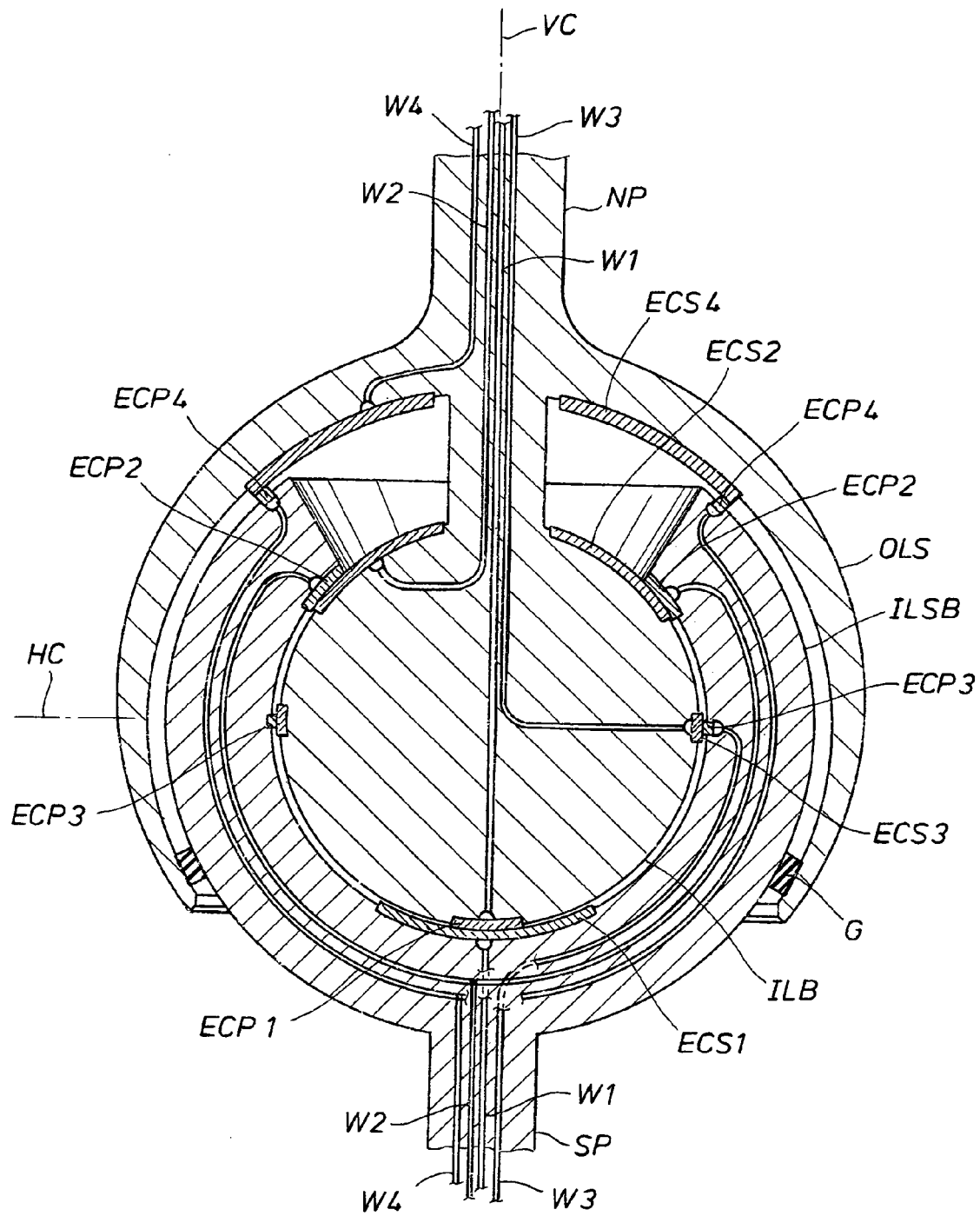
FIG. 1 illustrates an embodiment of a four connector snap-apart connection device of the instant invention. Four electrical connections are provided between four lines running upward and downward through the connector device of FIG. 1. A compressive water-proof gasket is further illustrated between the outer layer and the intermediate layer.
Figure 3:
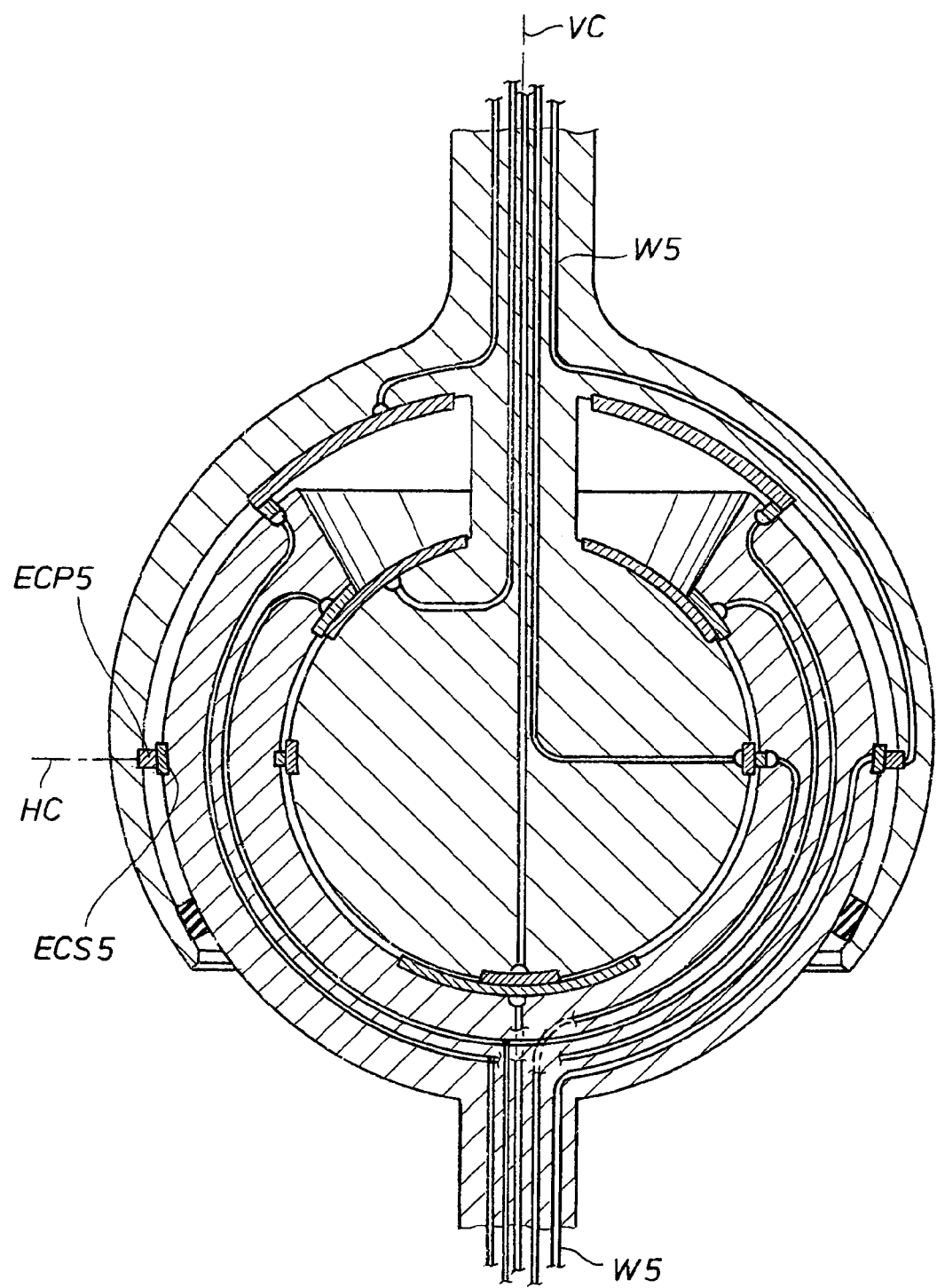
FIG. 3 illustrates the placement of a fifth contact point in the embodiment of FIG. 1.

As illustrated in FIG. 1, a hollow socket/ball layer can be configured to rotate over an inner ball layer, and to rotate within an outer shell layer. The inner ball and outer shell can form a unitary piece. In such a manner a provision for a fourth connector, as frequently required for telecommunications, can be accommodated. Even a fifth connector could be provided. Review of FIG. 3 illustrates that a fifth electrical or electronic communication link could be provided between the outer shell and the inner intermediate layer at approximately an equatorial location. This would be analogous to the connection provided between the elements 12 and 22 on the original "ball and socket" connector. If four electrical connection paths were needed, any four of the five potential paths could be utilized.

Figure 2:
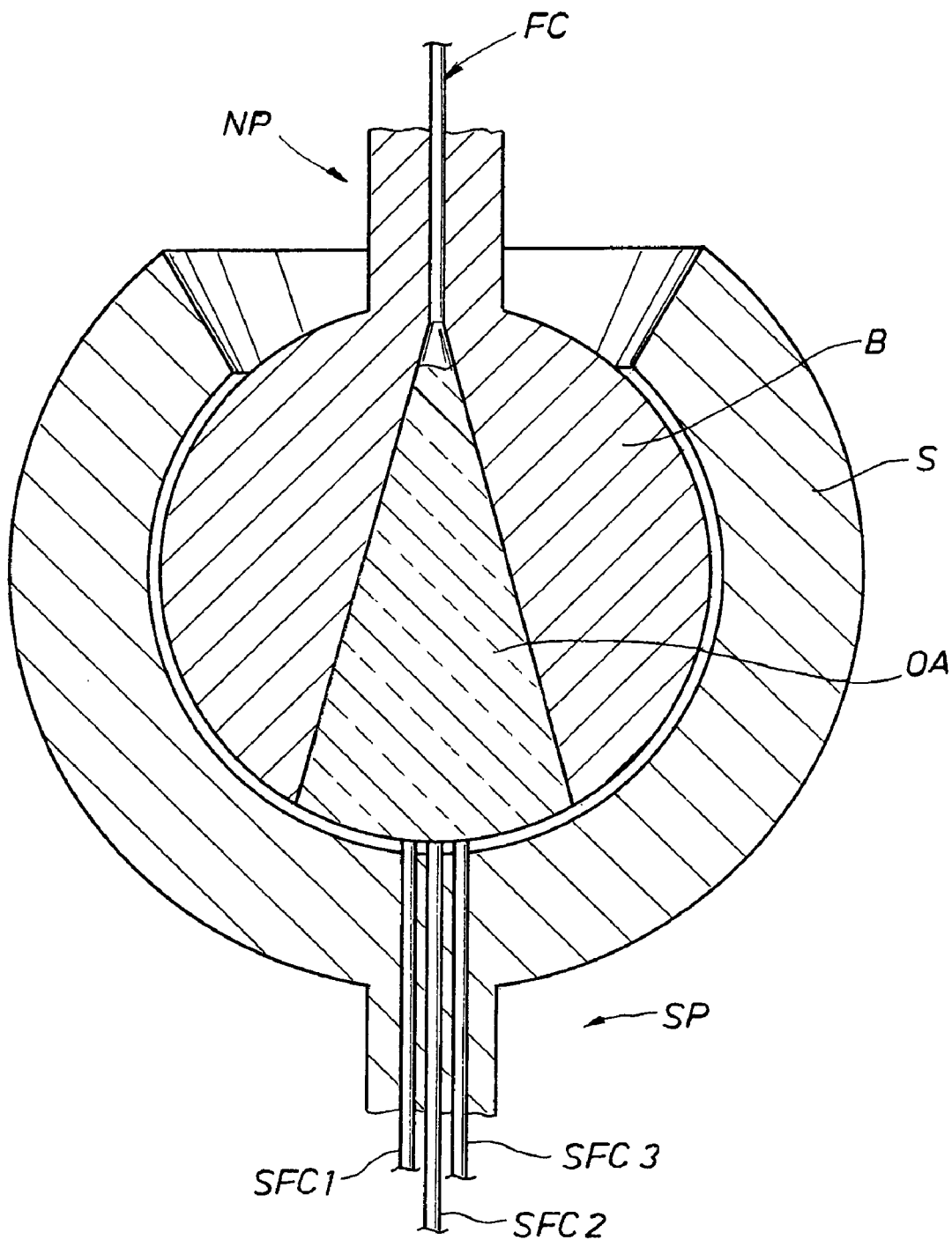
FIG. 2 illustrates the use of a snap-apart electrical connection device for splitting optical grade fiber paths. An optical grade fiber path can be directed into a ball wherein it is allowed to spread through optical grade acrylic. A plurality of optical grade fiber paths can be used to receive and communicate the optical path information, the plurality of optical grade fiber paths being located in the socket of the snap apart universally jointed ball and socket device.

FIG. 2 illustrates a further use for a snap-apart "ball and socket" connector as a fiber optic connector and splitter. The connector of exhibit 2 splits a signal from a first optic fiber into plural optic fibers while permitting relative rotation and pivoting of a first optical line with respect to the plural connected optical lines feeding into the connector. Providing for such pivoting and rotation at an optic fiber splitting joint could be useful in the optic fiber industry to avoid an unacceptable kinking of optic fiber lines, and to provide flexibility.

One paradigmatic use for the snap-apart connector devices, for optical communications and/or telecommunications, lies in adaptor strips, wherein multi-connections are provided.

Referring to the drawings in more detail, FIG. 1 illustrates an embodiment of an adjustable electrical connection system providing at least four electrical contact points. Wires W1, W2, W3 and W4, suitable for communicating electrical power or data signals, are shown entering the connection device from the top, or north, pole NP and exiting the connection device from the lower, or south, pole SP. The device provides for continuous electrical contact and communication along the wires W1, W2, W3 and W4. Rotation of the north pole NP with respect to the south pole SP does not cause loss of connection or twisting of the south pole wires, and vice versa. Tilting of north pole NP, up to about 30° in the respect to south pole SP, does not result in loss of connection or torqueing of the south pole wires, and vice versa.

The device is comprised of an inner layer ball ILB connected to an outer layer shell OLS which (preferably) snaps into and over an intermediate layer socket/ball ILSB. Four electrically conducting surfaces and mating electrically conductive "contact points" are illustrated in FIG. 1. (Note that a "contact point" typically comprises a strip or band or area of material. The word "point" is used for convenience.)

Toward the bottom of the embodiment of FIG. 1 electrically conductive surface ECS1 resides on the lower inside surface of intermediate layer socket/ball. Electrically conductive surface ECS1 mates with electrically conductive contact point ECP1 residing on the lower or south end of the inner layer or ball ILB. Again, although a "contact point" may be appear to be a point in the cross-sectional illustrative drawing, in actuality the contact points may be a strip or a band or an area. Electrically conductive point ECP1, that resides on the lower pole of the inner layer ball ILB, is also indicated by character 20 in the prior art patents incorporated by reference, wherein ECS1 is indicated by character 10.

The prior art patents, incorporated by reference herein, illustrate how electrically conductive surfaces ECS1, ECS2 and ECS3 maintain electrical contact with contact points ECP1, ECP2 and ECP3, respectively, during rotation of the north pole with respect to the south pole and during limited tilting of the north pole with respect to the south pole of the connector device. ECS1 and ECP1 correspond to characters 10 and 20 in the prior art patent. ECS2 and ECP2 correspond to characters 24 and 14A/14B in the prior art patent. ECS3 and ECP3 correspond to elements 22 and 12 in the prior art patent.

The novel fourth connector surface and contact point is provided by ECS4 and ECP4, and is located as shown and described above. ECS4 should be understood to comprise a band of material.

FIG. 1 further illustrates the placement of a compressible weatherproof gasket G between end portions of the shell OLS and intermediate layer ILSB.

FIG. 2 illustrates a preferred embodiment of the instant invention relating to optical fibers. In the embodiment of FIG. 2 an optical grid fiber cable FC is brought in through the north pole NP of the connector device wherein it is split into three split optical grade fiber cables FSC1, FSC2 and FSC3 exiting the south pole SP of the connector device. The north pole of the ball B of the connector device may be rotated with respect to the socket S and the south pole SP of the connector device without affecting the splitting of the optical grade fiber cable FSC into three split optical grade cables FSC1, FSC2 and FSC3. Furthermore, the north pole of ball B may be tilted approximately up to 30° with-respect to the south pole and socket S of the connector device without affecting the capacity to split the optical grade fiber cable FC into three split optical fiber cables. The center portion of ball B comprises a cone of optical grade acrylic OA in order to permit the spreading of the signal from optical grade fiber cable FC in transit through ball B.

FIG. 3 illustrates the placement of a fifth electrical or digital data connection relating to the embodiment of FIG. 1. An electrically conducting contacting surface ECS5 is created around the exterior of the equator of the socket or intermediate layer. This contact surface is typically a band. An electrically conductive contact point ECP5 is created to mate with the electrically conductive contact surface ECS5, and is situated upon the equator of the interior of the outer layer or shell. Again, the electrically conductive contact point is typically an equatorial band in such manner a fifth conductive path is created through the connection device.

Figure 4:
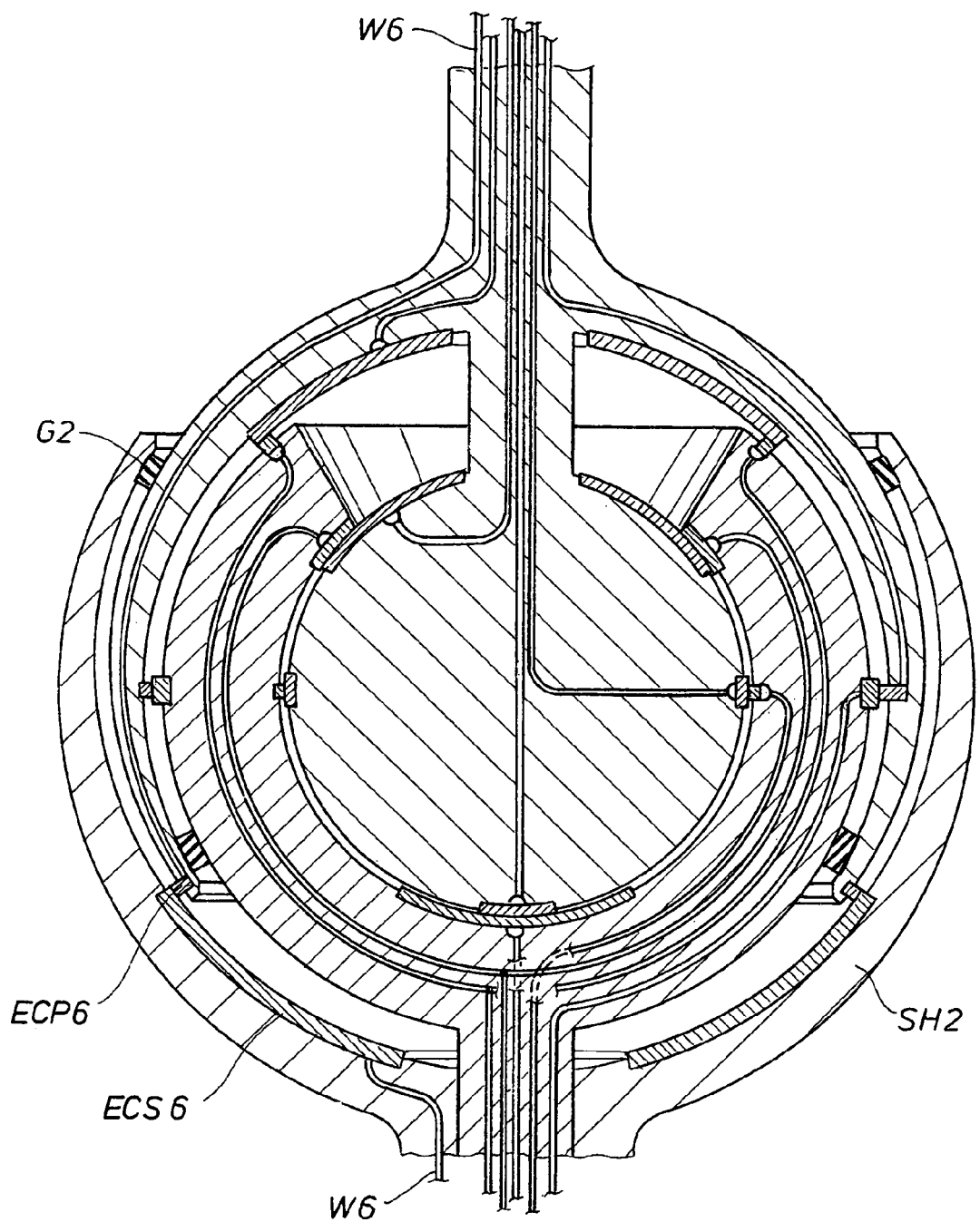
FIG. 4 illustrates an alternate embodiment providing for a plurality of shells and six (or more) contact points, based on the structure of FIG. 1.

FIG. 4 illustrates a further alternative embodiment based upon the structure of FIG. 1. FIG. 4 illustrates the capacity to add additional shells providing additional electrical contacts as well as extra weatherproof gaskets. FIG. 4 shows a second shell S142 connected to the intermediate layer or socket. A potentially sixth electrical connection is provided by the lower electrically conductive surface band ECS6 located on the interior of the second shell SH2 and provided by electrically conductive contact point ECP6 located on a lower exterior portion of the first shell. A second weatherproof gasket G2 is further provided to enhance protection from the environment.

The foregoing description of preferred embodiments of the invention is presented for purposes of illustration and description, and is not intended to be exhaustive or to limit the invention to the precise form or embodiment disclosed. The description was selected to best explain the principles of the invention and their practical application to enable others skilled in the art to best utilize the invention in various embodiments. Various modifications as are best suited to the particular use are contemplated. It is intended that the scope of the invention is not to be limited by the specification, but to be defined by the claims set forth below. Since the foregoing disclosure and description of the invention are illustrative and explanatory thereof, various changes in the size, shape, and materials, as well as in the details of the illustrated device may be made without departing from the spirit of the invention. The invention is claimed using terminology that depends upon a historic presumption that recitation of a single element covers one or more, and recitation of two elements covers two or more, and the like. Also, the drawings and illustration herein have not necessarily been produced to scale.

What is claimed is:

1. An adjustable at least four-way electrical connector for signal, voice, digital data and/or power, comprising:
at least four electrical connections provided within a layered ball and socket connector device, the device providing for full rotation of an intermediate layer with respect to an inner layer and an outer layer about a first axis and providing for approximately up to 30 degrees of pivot of the intermediate layer with respect to the inner layer and outer layer about the first axis.

2. The adjustable electrical connector device of claim 1 wherein the intermediate layer and the inner and outer layers, respectively, snap together and apart.

3. The electrical conductor of claim 1 including an insulating gasket between the outer layer and the intermediate layer.

4. The device of claim 1 providing an equatorially located electrical connection between equatorially located electrically conductive surfaces on the exterior of the intermediate layer and on the interior of the outer layer.

5. The device of claim 1 providing a further shell attached to the intermediate layer, the further shell and outer layer structured and constructed in combination to provide at least one electrical connection and one weatherproof gasket therebetween.

6. The device of claim 4 providing a further shell attached to the intermediate layer, the further shell and outer layer structured and constructed in combination to provide at least one electrical connection and one weatherproof gasket therebetween.

* * * * *